United States Patent
Malpassi

[15] 3,695,438
[45] Oct. 3, 1972

[54] GASOLINE PRESSURE REGULATOR DEVICE

[72] Inventor: Alberto Malpassi, Via Montello 56, Seregno, Italy

[22] Filed: July 6, 1970

[21] Appl. No.: 52,627

[30] Foreign Application Priority Data

July 19, 1969 Italy ..................9561 B/69
Feb. 14, 1970 Italy ................20863 B/70

[52] U.S. Cl. ...........................210/137, 210/430
[51] Int. Cl. .........................................B01d 29/36
[58] Field of Search........................210/137, 430

[56] References Cited

UNITED STATES PATENTS 2,707,051  4/1955  Mailhot et al. ............210/137
3,228,523  1/1966  Koate et al. ...............210/137
2,633,146  3/1953  Witt.......................210/137 X
1,863,103  6/1932  Dowins....................210/137

Primary Examiner—John Adee
Attorney—Guido Modiano and Albert Josif

[57] ABSTRACT

A petrol or gasoline pressure regulator device, particularly for motor vehicles, comprising a regulator body with two chambers separated by a diaphragm and a valve member controlling a communication duct to one of said chambers and acting on said diaphragm, the combinated effect of said valve member and of said diaphragm controlling the pressure of the petrol or gasoline inside said regulator body.

1 Claim, 4 Drawing Figures

PATENTED OCT 3 1972 3,695,438

INVENTOR
Alberto MALPASSI
BY
AGENT

GASOLINE PRESSURE REGULATOR DEVICE

BACKGROUND OF THE INVENTION

The present invention relates to a petrol or gasoline pressure regulator device which is of particular, but not exclusive, use in motor vehicles.

It is known that in motor vehicles the fuel (petrol) contained in the vehicles fuel tank is passed to the carburetor and thence to the explosion chamber by a pump called the petrol pump.

Since the thrust exerted on the fuel by the pump is discontinuous or fluctuating, it has for long been suggested to interpose a petrol-pressure adjustment member between the petrol pump and the carburetor. However, while the known adjustment members have provided improvements in the art, they have been found to be unsatisfactory for the adjustment of the petrol-pressure.

SUMMARY OF THE INVENTION

The main object of the present invention is that of providing a petrol-pressure regulator device which delivers a flow of petrol which is adjusted with precision, even when the pressure of the petrol arriving at the device is subject to considerable variations, such flow being adjustable over a wide range of values in order to satisfy the needs of the members employing the fuel (the carburetor and the engine).

Another object of the present invention is that of providing a petrol-pressure adjustment or regulator device which adjusts the pressure of the petrol by eliminating impurities contained in the petrol, the element which eliminates such impurities being replaceable.

Another object of the present invention is that of providing a petrol-pressure adjustment device which is of simple construction and use.

A further object of the invention is that of providing petrol-pressure adjustment device which may be produced in relatively small sizes and may be readily adapted and mounted in very small spaces.

According to the invention there is provided a petrol-pressure adjustment device, particularly for motor vehicles, characterized in that it comprises an adjustment body and a filter body which are in fluid-tight communication through an aperture and a communication duct, said adjustment body comprising a first and a second chamber separated by a laminar diaphragm, said first chamber being substantially closed and said second chamber being in communication with said filter body through said communication duct, said filter body comprising a liquid filter element arranged between said aperture and said communication duct, a valve member controlling said communication duct, resilient holding means and adjustment means for said valve member, at least one inlet duct and at least one outlet duct, resilient fixture means being provided for fixing said filter body to said adjustment body.

BRIEF DESCRIPTION OF THE DRAWING

Further characteristics and advantages of the invention will appear more clearly from the following detailed description of a preferred embodiment of a petrol-pressure adjustment device according to the invention, illustrated by way of example in the accompanying drawing, in which.

DESCRIPTION OF THE PREFERRED EMBODIMENTS

Figure 2:
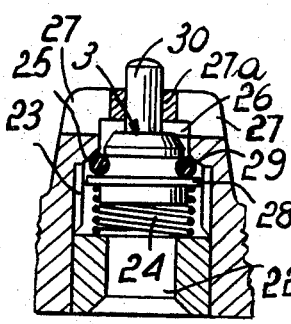
FIG. 2 is a sectional view, to an enlarged scale, of a valve portion of the device of FIG. 1.
Figure 1:
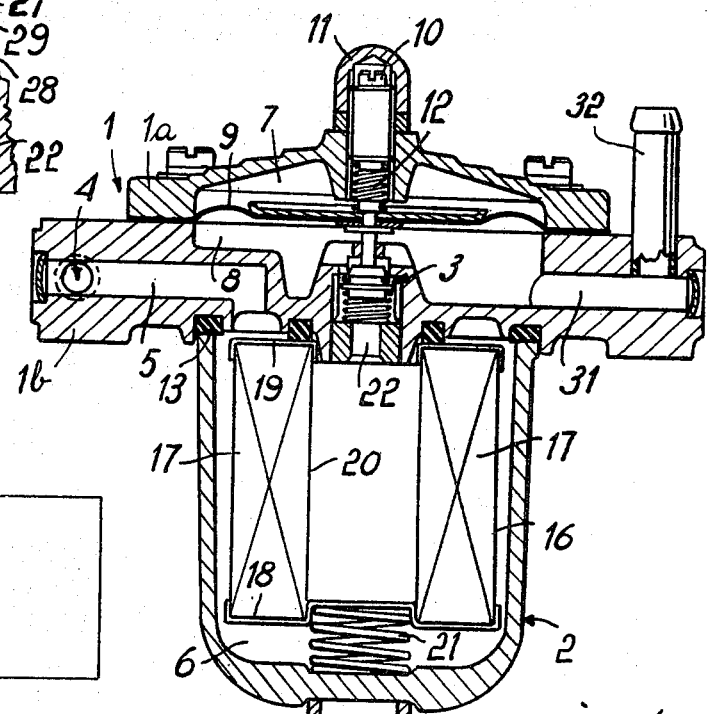
FIG. 1 is a longitudinal sectional view of a petrol-pressure adjustment device according to the invention.

With reference to the figures, 1 indicates the regulator body of the petrol-pressure regulator device, 2 indicates a filter body removably attached thereto and 3 indicates a valve member interposed between the bodies 1 and 2. The device has an inlet union 4 which communicates through a duct 5 with the interior 6 of the filter body 2. In the body 1 of the device, substantially formed in two pieces 1a and 1b, there are provided a first and a second chamber 7 and 8, respectively, which are separated by a laminar diaphragm 9. The air chamber 7 is substantially closed. The position of the laminar diaphragm 9 may be adjusted by means of an adjustment screw 10. The head of the screw 10 is covered by a cap 11 and a spring 12 is arranged between the screw 10 and the diaphragm 9.

The filter body 2 is in fluid-tight communication with the body 1 through a gasket 13 and is maintained in position by a U-shaped tie-rod whose ends are engaged in the body 1 and whose central portion is engaged in the tang 15 of the filter body 2. The body 2 internally carries a filter member 16 of the replaceable cartridge kind, comprising filter surfaces (not shown) arranged in 17 between end plates 18 and 19 and the cylindrical cavity 20. Against the lower end plate 18 of the filter member 16 there acts a spring 21. The upper end plate 19 of the filter 16 has a circular hole adjacent a communication passage 22 between the body 2 and the body 1. As is clearly shown in FIG. 2, said communication passage 22 includes a cylindrical seat 23 for the valve member 3 and a relative thrust spring 24. The upper end of said seat 23 has a conical tapered portion which opens into a cylindrical duct 26 whose upper end communicates with a apertures 27, provided in the number 27a which also forms guiding means for the valve stem 30.

The valve member 3 substantially comprises a generally cylindrical valve cone having an annular groove retaining an O-ring gasket 29, a central projecting shoulder 28 whose upper face is in abutting engagement with the O-ring gasket 29, the upper surface of said annular 29 being in engagement with the conical tapered portion 25 of said communication path 22. The upper end of the valve member 3 terminates in a pin 30 which engages the laminar diaphragm 9. The resilient gasket 29 has the advantage of providing a better fluid-tight seal than other seal elements, such as the known use of two conical metal surfaces.

Reference numeral 31 indicates the outlet or delivery duct of the petrol-pressure adjustment device, and reference numeral 32 indicates the connection union for said delivery duct.

Figure 3:
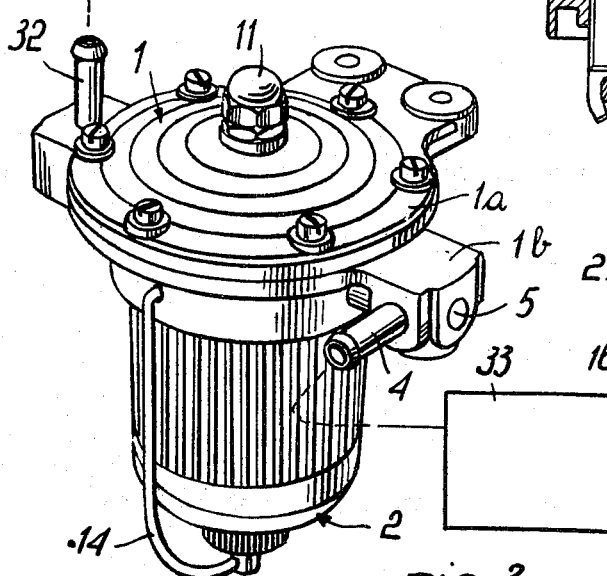
FIG. 3 is a perspective view of the same petrol-pressure adjustment device.

FIG. 3 diagrammatically shows a petrol pump 33 and a carburetor 34 which are connected to the inlet union 4 and the outlet union 32, respectively.

The working of the petrol-pressure adjustment device according to the embodiment will now be described.

The petrol pump 33 passes fuel under pressure into the internal space 6 of the filter body 2 through the duct 5. Such fuel (petrol) passes through the filter elements 17 to the cylindrical space 20 and thence, through the communication duct 22 controlled by the valve member 3, into the chamber 8. The fuel then leaves the chamber 8 through the outlet union 32 and passes into the carburetor 34. Since the fuel under pressure which is delivered by the pump 33 has a substantially fluctuating pressure, the chamber 8 will be forced to expand or contract, like a lung, under the action of the fluctuating pressure of the fuel passing into the chamber 8 through the duct 22. In particular, the expansion of said chamber 8 causes the compression of the spring 12 through the laminar diaphragm 9, while in the contraction of the chamber 8, the spring 12 forces the diaphragm 9 downwards, reducing the volume of the chamber 8.

Evidently the lowering of the diaphragm 9 causes the lowering of the valve member 3 and, consequently, the controlled opening of the communication duct 22. It follows that the pressure of the fuel in the chamber 8 depends almost exclusively on the rate of flow of fuel required by the carburetor 34, and is independent of the pressure applied to the fuel by the pump 33 upstream of the petrol-pressure adjustment device. In this way the device provides the carburetor and the explosion chamber with a flow of fuel which does not fluctuate and is stable in all driving conditions. Differences in climate and altitude in which the motor vehicle finds itself are compensated by the reaction of the diaphragm 9. The petrol-pressure adjustment device can provide a delivery pressure of up to five times that necessary for supplying the carburetor with the normal quantity of fuel.

The characteristics described above lead to a saving in fuel of from 10 to 15 percent with respect to similar motor vehicles which do not employ an adjustment device according to the invention.

Figure 4:
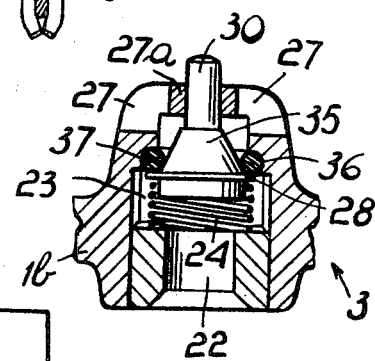
FIG. 4 is a view in an enlarged scale, of a valve element according to a further embodiment thereof.

Now considering FIG. 4 in detail, where the same elements as in FIG. 2 are indicated with the same reference numbers, the valve element consists of an intermediate frusto-conical member or section 35, to the bases of which there are rigidly connected the stem member or pin 30 at the smaller base and the annular shoulder 28, respectively, which radially projects over the larger base closely thereto.

On the annular shoulder 28 at the side opposite the frusto-conical section 35 a spring 24 also acts. The latter rests at the other end thereof against a shoulder defined by the seat 23 becoming narrower towards the communication passage 22.

At the frusto-conical section 35 of the valve element the side wall of the passage 22 is formed with an annular cavity 36 arranged to receive a toroidal gasket 37 in such a manner, however, as to cause the latter to project through a substantial portion of its inner and lower surface over its seat. The inner diameter of the gasket 37 is selected so as to be smaller than the maximum diameter of the frusto-conical section 35.

While considering now the operation of this valve in detail, it may be seen that the frusto-conical section 35, in the closed condition, first makes contact along a circumference with the fixed gasket 37, the said contact taking place when the gasket is not in contact with the shoulder 28 yet. Upon a further closing operation the section 35 causes the gasket to expand due to said surface having a greater diameter than the gasket 37. Sealing is also provided by the pressure contact between the shoulder 28 and the gasket in the lower portion.

Conversely the conical surface permits a more uniform adjustment of the passage opening relative to the movement of the valve element.

For carrying out the elements forming the pressure adjuster according to the invention the used materials could be any according to requirements.

I claim:

1. A pressure regulator device, particularly for regulating gasoline pressure in motor vehicles, of the character comprising a regulator body and a filter body removably attached thereto, a first and a second chamber provided inside said regulator body, a diaphragm inside said regulator body separating said first and second chamber from each other, an inlet for gasoline into said filter body, means defining a communication passage between said second chamber and said filter body, valve means inside said communication passage for opening and closing said communication passage, said valve means having a valve stem cooperating with said diaphragm, resilient means urging said diaphragm and said valve stem against each other and an outlet for gasoline from said second chamber and wherein, according to the improvement, said valve means comprises a generally cylindrical valve cone body axially movable inside said communication passage and rigid with said valve stem, an annular groove in said valve cone body, a projecting shoulder on said valve cone body adjacent said groove and having two opposite faces, resilient means inside said communication passage bearing with one end thereof against one of said faces of said projecting shoulder and connected with other end thereof to said regulator body, an annular gasket means retained within said annular groove and abutting against the other of said faces of said projecting shoulder, said means defining said communication passage having a frusto-conical portion cooperating with said annular gasket means in sealing off said communication passage when said generally cylindrical valve cone body is in its closing position and guiding means for said stem of said valve means.

* * * * *